(12) United States Patent
Hoprich

(10) Patent No.: US 8,984,514 B2
(45) Date of Patent: Mar. 17, 2015

(54) MODIFYING SCHEDULED EXECUTION OF OBJECT MODIFICATION METHODS ASSOCIATED WITH DATABASE OBJECTS

(75) Inventor: Wieland Hoprich, Mannheim (DE)

(73) Assignee: SAP SE, Walldorf (DE)

( * ) Notice: Subject to any disclaimer, the term of this patent is extended or adjusted under 35 U.S.C. 154(b) by 300 days.

(21) Appl. No.: 12/956,902

(22) Filed: Nov. 30, 2010

(65) Prior Publication Data
US 2012/0137297 A1 May 31, 2012

(51) Int. Cl.
G06F 9/46 (2006.01)
G06F 17/30 (2006.01)
G06F 9/48 (2006.01)

(52) U.S. Cl.
CPC .... *G06F 17/30297* (2013.01); *G06F 17/30607* (2013.01); *G06F 9/4843* (2013.01)
USPC ...................................................... 718/101

(58) Field of Classification Search
None
See application file for complete search history.

(56) References Cited

U.S. PATENT DOCUMENTS

| | | | |
|---|---|---|---|
| 6,105,025 A | 8/2000 | Jacobs et al. | |
| 6,151,608 A * | 11/2000 | Abrams | 707/679 |
| 6,385,770 B1 | 5/2002 | Sinander | |
| 6,711,560 B2 * | 3/2004 | Levy et al. | 1/1 |
| 6,721,725 B2 * | 4/2004 | Levy et al. | 1/1 |
| 6,999,977 B1 | 2/2006 | Norcott et al. | |
| 7,028,022 B1 | 4/2006 | Lightstone et al. | |
| 7,085,831 B2 * | 8/2006 | Larkin | 709/223 |
| 7,111,023 B2 | 9/2006 | Norcott | |
| 7,236,991 B2 | 6/2007 | Becker et al. | |
| 7,461,097 B2 | 12/2008 | Stahl et al. | |
| 7,523,142 B2 | 4/2009 | Driesen et al. | |
| 7,620,665 B1 * | 11/2009 | George et al. | 1/1 |
| 7,647,354 B2 | 1/2010 | Norcott | |
| 7,657,576 B1 | 2/2010 | Norcott | |
| 7,694,292 B2 | 4/2010 | Mueller et al. | |
| 7,917,475 B2 | 3/2011 | D'Souza et al. | |
| 8,060,713 B1 | 11/2011 | Natanzon | |
| 8,230,416 B2 | 7/2012 | Ivanov | |
| 8,527,471 B2 | 9/2013 | Hoprich et al. | |
| 2002/0143731 A1 * | 10/2002 | Levy et al. | 707/1 |
| 2003/0130985 A1 | 7/2003 | Driesen et al. | |
| 2003/0135478 A1 | 7/2003 | Marshall et al. | |

(Continued)

OTHER PUBLICATIONS

Hudson, "Slashing Downtimes with Online Patching", Oracle, 2011, 54 pages.
"Triggers", Oracle8iConcepts, Release 2 (8.1.6), Part No. A76965-01, 2000, 23 pages.

(Continued)

*Primary Examiner* — Emerson Puente
*Assistant Examiner* — Paul Mills
(74) *Attorney, Agent, or Firm* — Brake Hughes Bellermann LLP

(57) ABSTRACT

An original schedule module configured to receive an original schedule configured to trigger execution of a first original batch of entries including a set of object modification methods and a corresponding set of database objects before triggering execution of a second original batch of entries including a set of object modification methods and a corresponding set of database objects. An analysis module can be configured to determine logic for execution of each entry from the first original batch of entries based on the original schedule. A schedule generator can be configured to define, based on the logic for execution and based on the original schedule, a modified schedule configured to trigger parallel execution of a first modified batch of entries including less than all of the first original batch of entries, and a second modified batch of entries including less than all of the second original batch of entries.

20 Claims, 4 Drawing Sheets

(56) References Cited

U.S. PATENT DOCUMENTS

| | | |
|---|---|---|
| 2004/0044997 A1 | 3/2004 | Talati et al. |
| 2005/0165802 A1* | 7/2005 | Sethi et al. ............. 707/100 |
| 2005/0251523 A1 | 11/2005 | Rajamani et al. |
| 2007/0027934 A1 | 2/2007 | Roehrle et al. |
| 2007/0180289 A1 | 8/2007 | Chai et al. |
| 2007/0220065 A1 | 9/2007 | Coyle et al. |
| 2007/0250542 A1 | 10/2007 | Chan et al. |
| 2008/0098037 A1 | 4/2008 | Neil et al. |
| 2008/0098046 A1 | 4/2008 | Alpern et al. |
| 2008/0115134 A1 | 5/2008 | Elliott et al. |
| 2008/0256528 A1 | 10/2008 | Waitzmann et al. |
| 2008/0294933 A1 | 11/2008 | Nishii et al. |
| 2009/0077563 A1* | 3/2009 | Thies et al. ............. 718/106 |
| 2009/0094236 A1 | 4/2009 | Renkes et al. |
| 2009/0113413 A1 | 4/2009 | Reinz |
| 2009/0172655 A1 | 7/2009 | Ivanov |
| 2009/0307277 A1 | 12/2009 | Grubov et al. |
| 2010/0088281 A1 | 4/2010 | Driesen et al. |
| 2010/0211548 A1 | 8/2010 | Ott et al. |
| 2010/0218196 A1* | 8/2010 | Leung et al. ............. 718/107 |
| 2010/0249980 A1 | 9/2010 | Ito |
| 2010/0318494 A1 | 12/2010 | Val et al. |
| 2011/0252426 A1* | 10/2011 | Antani et al. ............. 718/101 |
| 2012/0089625 A1 | 4/2012 | Bentzien et al. |
| 2012/0166393 A1 | 6/2012 | Hoprich et al. |
| 2012/0166493 A1 | 6/2012 | Bentzien et al. |
| 2012/0185439 A1 | 7/2012 | Chen et al. |
| 2013/0159247 A1 | 6/2013 | Engelko et al. |
| 2013/0290259 A1 | 10/2013 | Hoprich et al. |

OTHER PUBLICATIONS

"Oracle Data Guard 11g Data Protection Availablity for Oracle Database", An Oracle Technical White Paper, Oct. 2011, 22 pages.

"Oracle Data Guard Concepts and Administration 11g Release 1 (11.1)", Part No. B28294-03 0racle, 2008, 2 pages.

Ray, et al, "Seamless Application Failover with Oracle Data Guard", Oracle, Dec. 2010, 67 pages.

"Oracle Beehive Administrator's Guide Release 1 (1.5)", Part No. E14836-04, Oracle, 2009, 8 pages.

"Oracle In-Memory Database Cache User's Guide 11g Release 2 (11.2.2)", Part No. E21634-05, Oracle, 2012, 5 pages.

"Openworld 2011—Day 3 Summary", Oracle Apps Blog, Oct. 26, 2011, 3 pages.

"Using Triggers", Oracle9i Application Developer's Guide—Fundamentals Release 2 (9.2), Part No. A96590-01, 2002, 43 pages.

Response to Non-Final Office Action received for U.S. Appl. No. 12/902,475, mailed on Sep. 10, 2013, 10 pages.

Response to Non-Final Office Action for U.S. Appl. No. 12/902,475, filed on Jun. 5, 2014, 14 pages.

Final Office Action Received for U.S. Appl. No. 12/902,475, mailed on Jun. 27, 2014, 20 pages.

Response to Non-Final Office Action for U.S. Appl. No. 13/325,896, filed on Jul. 22, 2014, 12 pages.

Final Office Action received for U.S. Appl. No. 13/325,896, mailed on Sep. 24, 2014, 23 pages.

Response to Final Office Action for U.S. Appl. No. 13/929,221, filed Jun. 5, 2014, 11 pages.

Notice of Allowance received for U.S. Appl. No. 13/929,221, mailed on Aug. 29, 2014, 14 pages.

* cited by examiner

MODIFYING SCHEDULED EXECUTION OF OBJECT MODIFICATION METHODS ASSOCIATED WITH DATABASE OBJECTS

TECHNICAL FIELD

This description relates to upgrading an original system to a target system.

BACKGROUND

Many known techniques for upgrading portions of an original system can cause an undesirable level of downtime within the original system. For example, using many of these known techniques, all (or nearly all) of the database objects of an original system may be unavailable to users while the database objects are being upgraded, and the upgrading of the objects may necessarily be implemented during a downtime of the entire original system. The duration and impact of the downtime of the original system and/or unavailability of the database objects targeted for upgrade can be aggravated by computationally expensive and/or time-consuming algorithms used to modify the database objects of the original system into an upgraded form. Thus, a need exists for systems, methods, and apparatus to address the shortfalls of present technology and to provide other new and innovative features.

SUMMARY

In one general aspect, a computer system including instructions stored on a non-transitory computer-readable storage medium. The computer system can include an original schedule module configured to receive an original schedule configured to trigger execution of a first original batch of entries including a set of object modification methods and a corresponding set of database objects before triggering execution of a second original batch of entries including a set of object modification methods and a corresponding set of database objects. The computer system can include an analysis module configured to determine a logic for execution of each entry from the first original batch of entries based on the original schedule. The computer system can also include a schedule generator configured to define, based on the logic for execution and based on the original schedule, a modified schedule configured to trigger parallel execution of a first modified batch of entries including less than all of the first original batch of entries, and a second modified batch of entries including less than all of the second original batch of entries.

In another general aspect, a non-transitory computer-readable storage medium can store code representing instructions that when executed are configured to cause a processor to perform a process. The code can include code to receive an original schedule configured to trigger execution of a first original batch of entries including a set of object modification methods and a corresponding set of database objects before triggering execution of a second original batch of entries including a set of object modification methods and a corresponding set of database objects. The code can include code to determine a logic for execution of each entry from the first original batch of entries based on the original schedule. The code can include code to define, based on the logic for execution and based on the original schedule, a modified schedule configured to trigger parallel execution of a first modified batch of entries including less than all of the first original batch of entries, and a second modified batch of entries including less than all of the second original batch of entries.

In yet another general aspect, a method can include executing instructions recorded on a non-transitory computer-readable storage media using at least one processor. The method can include receiving an original schedule configured to trigger execution of a first original batch of entries including a set of object modification methods and a corresponding set of database objects before triggering execution of a second original batch of entries including a set of object modification methods and a corresponding set of database objects. The method can include determining a logic for execution of each entry from the first original batch of entries based on the original schedule. The method can also include defining, based on the logic for execution and based on the original schedule, a modified schedule configured to trigger parallel execution of a first modified batch of entries including less than all of the first original batch of entries, and a second modified batch of entries including less than all of the second original batch of entries.

The details of one or more implementations are set forth in the accompanying drawings and the description below. Other features will be apparent from the description and drawings, and from the claims.

DETAILED DESCRIPTION

Figure 1:
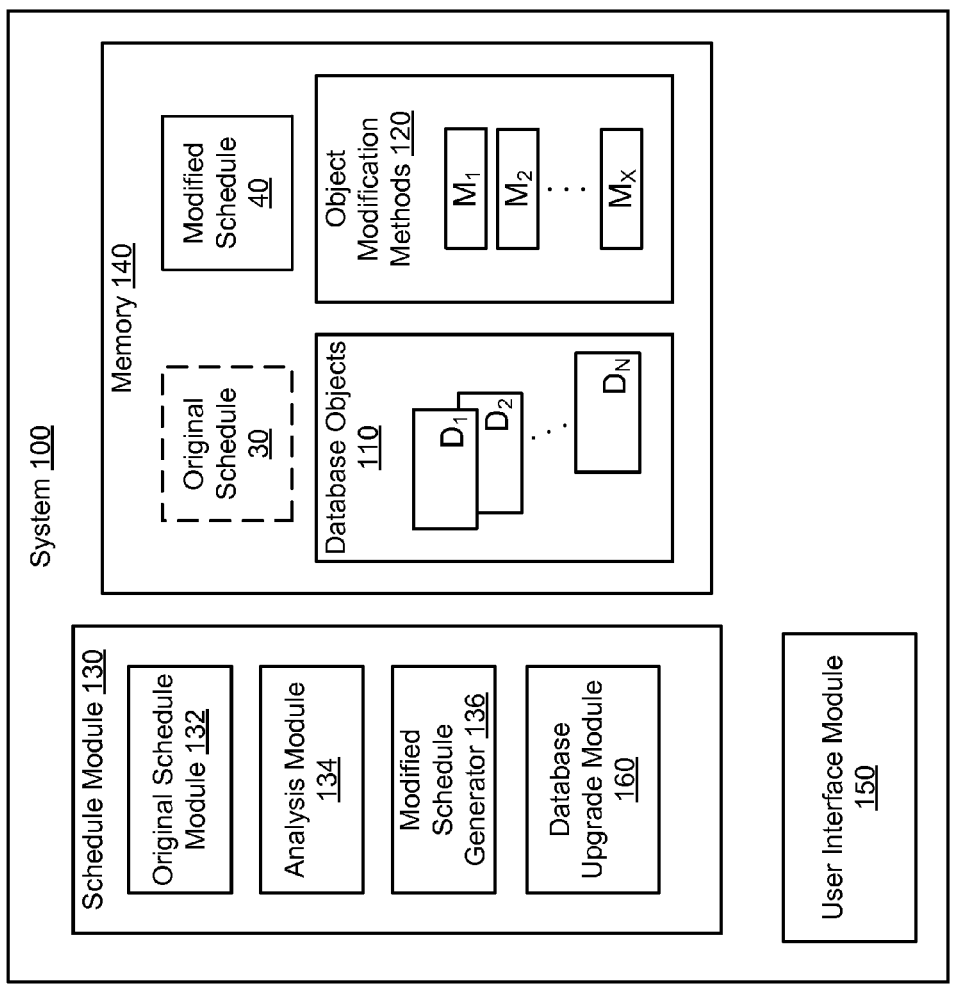
FIG. 1 is a block diagram that illustrates a schedule module configured to facilitate modification of database objects of a system.

FIG. 1 is a block diagram that illustrates a schedule module 130 configured to facilitate modification of database objects 110 of a system 100. The database objects 110 include database object $D_1$ through database object $D_N$. In some embodiments, the database objects 110 can be, for example, a database (or portion thereof), metadata associated with the database, an executable file associated with a database, and/or so forth. In some embodiments, one or more of the database object 110 can be, for example, an Oracle database object, a DB2 database object, and/or so forth. In some embodiments, the structure of one or more of the database objects 110 can be defined by rows and/or columns. The data stored in a database object 110 can be divided into fields by the structure of the database object 110. For example, a field of a database object 110 can be at an intersection of a row of the database object 110 and a column of the database object 110, and can include a portion of data.

In some embodiments, the system 100 can include one or more of a stand-alone device, a stand-alone module, a server, a network, a data center, a software and/or hardware system, a virtual system, a system defined based on Advanced Business Application Programming (ABAP), and/or so forth. In some embodiments, the system 100 can be referred to as a target system.

The database objects 110 can be modified by (e.g., using) object modification methods 120. The object modification methods 120 include object modification method $M_1$ through object modification method $M_X$. For example, in some embodiments, the database object $D_1$ may be modified by the object modification method $D_2$. In some embodiments, one or more of the object modification methods 120 can be configured to modify one or more of the database objects 110 so that the database object(s) 110 are compatible with a portion of the system 100 as it exists and/or a portion of the system 100 that has been upgraded.

In some embodiments, one or more of the object modification methods 120 may be, for example, a standalone executable file, a single-use object modification method, and/or so forth. In some embodiments, one or more of the object modifications methods 120 can be configured to generate programming code that can be used to modify one or more of the database objects 110 and/or can be configured to produce runtime data associated with one or more of the database objects 110. In some embodiments, one or more of the object modification methods 120 can be configured to operate on (e.g., modify, access) at least a portion of metadata associated with one or more the database objects 110.

In some embodiments, one or more of the object modification methods 120 can be executed and used to modify one or more of the database objects 110 during, for example, upgrade of at least a portion of the system 100 (e.g., an executable file of the system 100, one or more databases of the system 100). In some embodiments, the object modification methods 120 can be used to modify one or more of the database objects 110 after the one or more database objects 110 have been imported into (e.g., transferred into, integrated into) the system 100. In some embodiments, one or more of the object modification methods 120 can be included in different categories. For example, the object modification methods 120 can be categorized as an after import method (AIM), an execution program after import (XPRA), and/or so forth. Different functional types of object modification methods can be included in each of the categories of object modification method. More details related to categories and functional types of objection modification methods are discussed in connection with FIGS. 2A through 2B.

In some embodiments, one or more of the database objects 110 and/or one or more of the object modification methods 120 may be associated with one or more support packages. In other words, modification of one or more of the database objects 110 can be based on one or more of the object modification methods 120. The database objects 110 and/or the object modification methods 120 used to modify the database objects 110 can be included in one or more support packages. More details related to object modification methods and support packages are described below and in connection with FIGS. 2A through 2B.

One or more of the database objects 110 can be modified by the object modification methods 120 based on a schedule. For example, database object $D_1$ may be modified using object modification method $M_2$ before database object $D_2$ is modified using object modification method $M_X$. The order of execution of object modification method $M_2$ to modify database object $D_1$ before execution of object modification method $M_X$ to modify database object $D_2$ can be specified in a schedule as separate entries. In some embodiments, the schedule can include entries that specify (or are defined by) combinations of object modification methods 120 and database objects 110 (which are modified by the object modification methods 120). For example, an entry within a schedule can include an object modification method 120 (which may be represented within the entry by an identifier) associated with and configured to modify a database object 110 (which may also be represented by an identifier within the entry).

In some embodiments, a schedule can specify an order (e.g., a serial order, a parallel order) of modification of the database objects 110 based on the object modification methods 120 (and thus can specify an order of execution of the object modification methods 120). For example, an order of modification of one or more of the database objects 110 based on one or more of the object modification methods 120 can be based on execution logic associated with (e.g., included in, defining) the schedule. In some embodiments, the order of execution of the object modification methods 120 used to modify the database objects 110 (and thus the order of modification of the database objects 110) can correspond with an order of entries included in the schedule.

In some embodiments, only a portion of the database objects 110 (e.g., a structure of the database objects 110, a location of the database objects 110, a set of rows/columns of the database objects 110, a portion of data within the database objects 110) may be modified based on a schedule. The portion of the database objects 110 that are to be modified based on a schedule can be referred to as database objects designated for modification. For example, only database object $D_1$ and database object $D_2$ may be modified based on object modification method $M_2$. Thus, database objects $D_1$ and $D_2$ are designated for modification based on object modification method $M_2$. In some embodiments, the modification of database objects $D_1$ and $D_2$ based on object modification method $M_2$ may be performed during an upgrade process of the system 100. During an upgrade process of the system 100, one or more portions (e.g., database objects, executable/program files) of the system 100 may be upgraded.

In this embodiment, the schedule module 130 is configured to define a modified schedule 40 configured to trigger execution of one or more of the object modification methods 120. The modified schedule 40 is configured to trigger execution of the one or more object modification methods 120 in a specified order. Specifically, the modified schedule 40 can trigger execution of at least a first portion of the modification methods 120 in a serial order and at least a second portion (different from the first portion) of the modification methods 120 in a parallel fashion. Thus, execution of at least a portion of the modification methods 120 are executed serially and at least a portion of the modification methods 120 are executed in parallel in response to the modified schedule 40.

In this embodiment, the modified schedule 40 is defined by the schedule module 130 based on an original schedule 30. Specifically, the schedule module 130 can be configured to define the modified schedule 40 so that entries included in a specified order in the original schedule 30 may be included in a different order in the modified schedule 40. Thus, one or more modification methods 120 and/or one or more database objects 110 modified by the modification method(s) 120 may be executed in a different order based on the modified schedule 40 than if using the original schedule 30. In some embodiments, the original schedule 30 may be configured to trigger execution of a portion of the modification methods 120 (to modify a portion of the database objects 110) in a serial fashion while the modified schedule 40 may be configured to trigger execution of the same portion of the modification methods 120 (to modify the portion of the database objects 110) in a parallel fashion.

The original schedule 30 is illustrated with a dashed line within FIG. 1 because, in some embodiments, the original schedule 30 may be replaced by the modified schedule 40. For example, in some embodiments, the original schedule 30 may be deleted or discarded when the modified schedule 40 is defined (e.g., in response to the modified schedule 40 being defined).

As shown in FIG. 1, the schedule module 130 includes an original schedule module 132, an analysis module 134, and a modified schedule generator 136. The original schedule module 132 can be configured to receive the original schedule 30 (e.g., the entries defined the original schedule 30) after the original schedule 30 has been defined. In some embodiments, the original schedule 30 may be automatically defined by the schedule module 130 and/or by a user such as a network administrator. In some embodiments, the original schedule 30 may be received by the original schedule module 132 of the schedule module 130 during an upgrade process of the system 100.

The analysis module 134 is configured to analyze the execution logic of the original schedule 30. In some embodiments, the execution logic can include an order of execution of one or more of the object modification methods 120 (to modify one or more of the database objects 110). In some embodiments, the order of execution of the one or more object modification methods 120 can be defined based on dependencies between at least a portion of the database objects 110 and/or dependencies between at least a portion of the object modification methods 120. For example, execution of object modification method $M_1$ to modify database object $D_2$ may be a prerequisite for execution of object modification method $M_2$ to modify database object $D_2$. In such instances, execution of object modification method $M_2$ to modify database object $D_2$ may fail if execution of object modification method $M_1$ to modify database object $D_2$ has not been previously performed. More details related to dependencies between portions of the database object 110 and/or between portions of the object modification methods 120 are described in connection with FIGS. 2A through 2B.

Based on the analysis of the execution logic of the original schedule 30, the modified schedule generator 136 can be configured to define the modified schedule 40. In some embodiments, the modified schedule generator 136 can be configured to define the modified schedule 40 so that the modified schedule 40 is consistent with the execution logic (e.g., execution order) of the original schedule 30. For example, the modified schedule generator 136 can be configured to define the modified schedule 40 so that an execution order based on dependencies between at least a portion of the object modification methods 120 and/or dependencies between at least a portion of the database objects 110 are maintained.

The terms up/upstate and down/downstate can be used to describe a functional state of the system 100, while the terms uptime and downtime can be used to describe the accessibility of the system 100 by one or more users (while in a functional state). Thus, the system 100 may only be operating during uptime (and be accessible by a typical user) when the system 100 is also up (e.g., in an upstate), but a system can have downtime (and may not be accessible by a typical user) when the system 100 is also up (e.g., in an upstate).

In some embodiments, the modified schedule 40 may be defined by the schedule module 130 based on the original schedule 30 during uptime (and an upstate) of the system 100. In some embodiments, the modified schedule 40 may be defined by the schedule module 130 based on the original schedule 30 during downtime (e.g., automatically during downtime) of the system 100 while the system 100 is in an upstate. In some embodiments, the modified schedule 40 may be defined by the schedule module 130 based on the original schedule 30 while the system 100 is in a downstate.

In some embodiments, one or more portions of schedule module 130 may be installed and used during upgrade of the system 100. In such embodiments, the schedule module 130 (and portions thereof) may be uninstalled after upgrade of the system 100 has been completed. In some embodiments, one or more portions of the schedule module 130 may be activated during upgrade of the system 100. In such embodiments, the schedule module 130 (and portions thereof) may be deactivated after upgrade of the system 100 has been completed.

In some embodiments, the schedule module 130 can be configured so that a user (not shown), or another process/module (not shown) may discard (e.g., override) the modified schedule 40 and instead use (e.g., revert to) the original schedule 30 via a user interface module 150. For example, after the modified schedule 40 has been defined by the schedule module 130, the modified schedule 40 can be presented to a user via the user interface module 150. The modified schedule 40 can be presented in a way that the user can confirm the modified schedule 40 or discard (e.g., deactivate, override) the modified schedule 40 so that modification using one or more of the object modification methods 120 can be performed using the original schedule 30 (which can be selected and/or reactivated).

In some embodiments, the schedule module 130 can be, or can be included within, for example, a client device and/or a server device associated with the system 100 (rather than operating at the system 100). In some embodiments, the schedule module 130 can be, or can be included within, for example, a wired device and/or a wireless device (e.g., wi-fi enabled device) and can be, for example, a computing entity (e.g., a personal computing device), a mobile phone, a personal digital assistant (PDA) and/or so forth. The schedule module 130 can be configured to operate based on one or more platforms (e.g., one or more similar or different platforms) that can include one or more types of hardware, software, firmware, operating systems, runtime libraries, and/or so forth. In some embodiments, the schedule module 130 can be defined using ABAP and/or can be related to a NetWeaver platform.

Although not shown, in some embodiments, the memory 140 can be implemented as more than one memory component (e.g., more than one random-access memory (RAM) component or disk drive memory) within the schedule module 130. In some embodiments, the memory 140 can be, or can include, a non-local memory (e.g., a memory not physically included within the schedule module 130) within a network (not shown). For example, the memory 140 can be, or can include, a memory shared by multiple system upgrade modules (not shown) within a network.

Although not shown, the schedule module 130 can be configured to operate within an environment that includes an operating system. In some embodiments, the operating system can be configured to facilitate the functions of the schedule module 130 and memory 140.

In some embodiments, the schedule module 130 can represent, or can be included within, a cluster of modules/devices. In such an embodiment, the functionality and processing of the schedule module 130 (e.g., the database upgrade module 160 of the schedule module 130) can be distributed to several modules/devices of the cluster of modules/devices.

In some embodiments, one or more portions of the components shown in the schedule module 130 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some embodiments, one or more portions of the schedule module 130 can be, or can include, a software module configured for execution by at least one processor (not shown). In some embodiments, the functionality of the components can be included in different modules and/or components than those shown in FIG. 1. For example, although not shown, the functionality of the modified schedule generator 136 can be included in a different module than the modified schedule generator 136, or divided into several different modules.

In some embodiments, the schedule module 130 can be included within a network that can include multiple devices (e.g., multiple client devices, multiple server devices). For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet. Also, although not shown in FIG. 1, the schedule module 130 can be configured to function within various types of network environments.

Figure 2A:
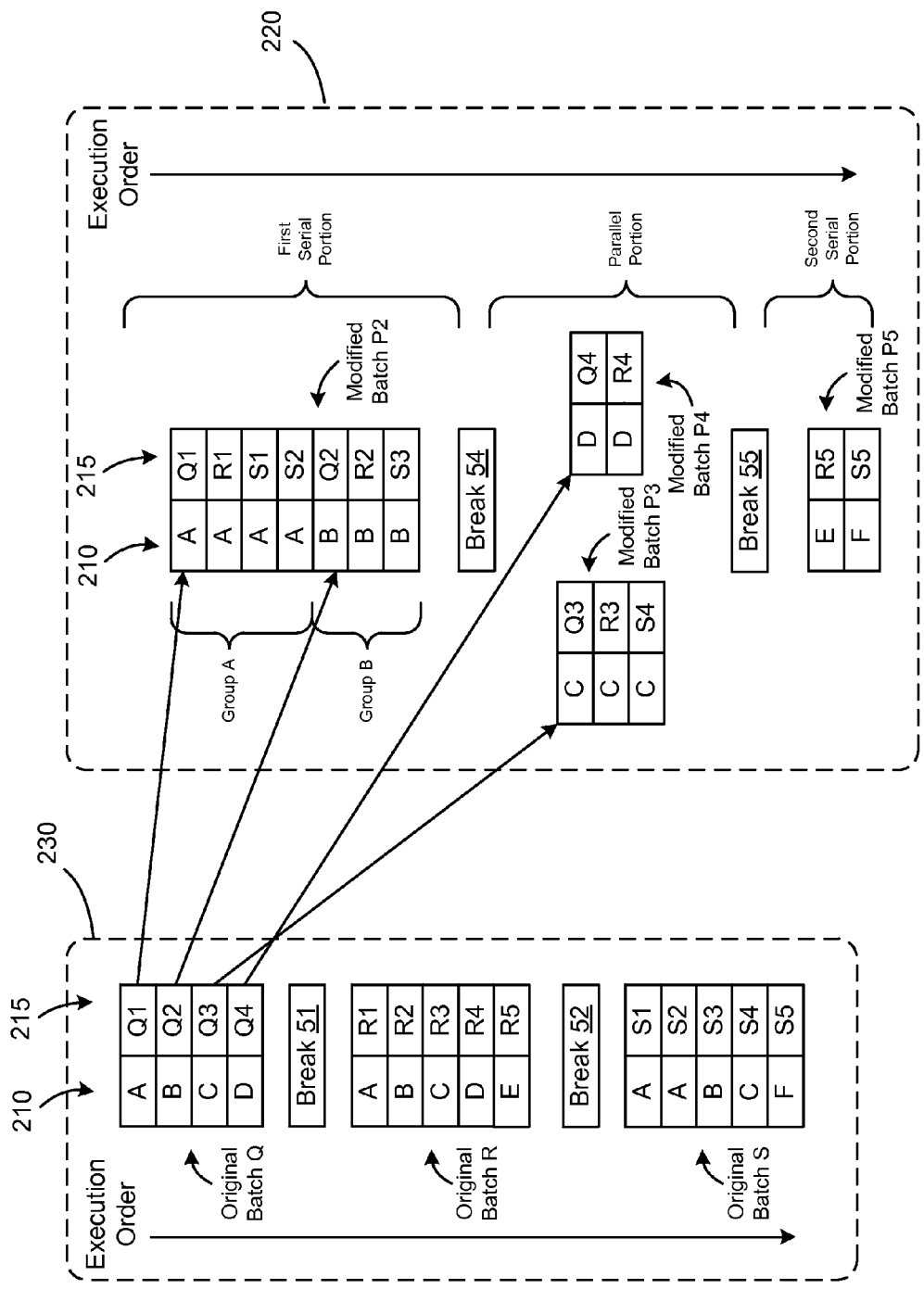
FIG. 2A is a diagram that illustrates a representation of a modified schedule defined based on a representation of the original schedule.

FIG. 2A is a diagram that illustrates a representation of a modified schedule 220 defined based on a representation of the original schedule 230. In some embodiments, the modified schedule 220 can be similar to the modified schedule 40 shown in FIG. 1, and the original schedule 230 can be similar to the original schedule 30 shown in FIG. 1. The modified schedule 220 can be defined based on the original schedule 230 by the schedule module 130 shown in FIG. 1.

As shown in FIG. 2A, the original schedule 230 includes object modification method identifiers 210 (including object modification method identifiers A through F) associated with database objects identifiers 215 (including database object identifiers Q1 through Q4, R1 through R4, and S1 through S5). Each of the object modification method identifiers 210 can be referred to by the object modification method that they represent. For example, the object modification method identifier C can be referred to as object modification method C. Similarly, each of the database object identifiers 215 can be referred to by the database object that they represent. For example, the database object identifier Q3 can be referred to as database object Q3.

In some embodiments, the object modification method identifiers 210 can represent metadata that describes an object modification method and/or can be used to trigger execution of an object modification method. In some embodiments, the object modification method identifiers 210 can represent a call of an object modification method. In some embodiments, the object modification method identifiers 210 can represent a location of an object modification method within a memory and/or a location from which an object modification can be called for execution.

Each of the object modification methods represented by the object modification method identifiers 210, when executed, is configured to modify at least one of the database objects represented by the database object identifiers 215. As a specific example, the object modification method B (shown in column 210), when executed, is configured to modify the database object Q2 (shown in column 215). The identifier of the object modification method B and the identifier of the database object Q2 can collectively define an entry within the original schedule 230. Thus, each combination of object modification method identifier 210 and database object identifier 215 can be referred to as an entry (or as a schedule entry). In some embodiments, an entry can include an identifier of a single object modification method configured to operate on multiple database objects (also identified within the entry). In some embodiments an entry can include identifiers of multiple object modification methods that are configured to operate on a single database object (also identified within the entry).

In some embodiments, the modified schedule 220 and/or the original schedule 230 can be implemented in various ways. For example, the modified schedule 220 can be implemented as a list (e.g., a linked list, a textual list), a database, and/or so forth. The modified schedule 220 can be configured to be processed by a processor that is configured to trigger execution of the entries included therein.

In some embodiments, the object modification method identifiers 210 can represent object modification methods, for example, defined as, or including, any type of executable software module such as a computer program based on, but not limited to, micro-code or micro-instructions, machine instructions, such as produced by a compiler, code used to produce a web service, and files containing higher-level instructions that are executed by a computer using an interpreter. For example, one or more the object modification methods may be implemented using a structured query language (SQL), a data definition language (DDL), Java, C++, or other programming languages (e.g., object-oriented programming languages) and development tools. In some embodiments, one or more of the object modification methods (represented by the object modification method identifiers 210) can define at least a portion of one or more applications associated with one or more of the database objects (represented by the database object identifiers 215).

In some embodiments, the object modification method identifiers 210 can represent object modification methods that can be, or can include, one or more database statements (which can also be referred to as database instructions). For example, the database statement can be an SQL statement such as "alter table add field" or "create index".

As mentioned above in connection with FIG. 1, one or more of the object modification methods represented by the object modification method identifiers 210 can be included in (e.g., classified within) different categories. For example, the object modification methods can be categorized as an AIM, or as an XPRA. An AIM can be an object modification method configured to modify one or more of the database objects represented by the database object identifiers 215 so that the database object(s) are compatible with a system (e.g., a system upgrade). In some embodiments, an AIM can be configured to produce runtime information, and/or can be configured to generate code that can produce runtime information. In some embodiments, an AIM can be configured to facilitate transport and/or import of one or more of the database object(s). In some embodiments, an AIM can be configured to operate on multiple database objects represented by the database object identifiers 215. For example, in some embodiments, a specific AIM can be configured to produce or make multiple databases (e.g., database objects) compatible with a first platform (e.g., a DB2 platform) based on metadata associated with the multiple database and/or based on metadata associated with multiple databases compatible with a second platform (e.g., an Oracle platform).

Similar to an AIM, an XPRA can be an object modification method configured to modify one or more of the database objects represented by the database object identifiers 215 so that the database object(s) are compatible with a system (e.g., a system upgrade). In some embodiments, an XPRA may not be configured to produce runtime information. In some embodiments, an XPRA can be configured as a single-use object modification method configured to operate on a single database object represented by one of the database object identifiers 215. For example, in some embodiments, an XPRA can be configured to convert data included in a database object from a first format (e.g., an original format) associated with a first system (e.g., an original system) to a second format (e.g., a different format) associated with a second system (e.g., an upgraded system). In some embodiments, the XPRA may only be executed once, because after the data and/or structure of the database has been converted from the first format to the second format, the data and/or structure of the database object that is later manipulated by the second system will be compatible with the second system because the second system already functions based on the second format.

In some embodiments, the object modification method identifiers 210 can represent object modification methods configured to perform different types of functions (also can be referred to as functional types of object modification methods). In some embodiments, object modification methods configured to perform different types of functions can be associated with an object modification method category. For example, each object modification method from a group of object modification methods can perform a different function, and each object modification method from the group of object modification methods can be associated with (e.g., classified within) a single category of object modification method such as a single-use object modification method (e.g., an XPRA) or as a multi-use object modification method (e.g., an AIM).

For example, one or more of the object modification methods can be configured to perform a function such as parsing extensible markup language (XML) information into internal table structures within a system (such as system 100 shown in FIG. 1). In some embodiments, one or more of the object modification methods can be configured to handle change documents related to, for example, financial transactions, and/or so forth. In some embodiments, one or more of the object modification methods can be configured to enhance one or more of the database objects (e.g., applications) represented by the database object identifiers 215 for a specific customized functionality that may not be included as a standard feature in the database object(s). In some embodiments, these types of object modification methods can be referred to as enhancement spot methods.

In some embodiments, one or more object modification methods represented by the object modification method identifiers 210 can be configured to modify the structure and/or data of one or more database objects represented by the database object identifiers 215. In some embodiments, one or more object modification methods represented by the object modification method identifiers 210 can be configured to modify the structure and/or data of one or more database objects represented by the database object identifiers 215 so that the structure and/or data of the database objects matches the structure and/or data of at least one target upgrade database object (not shown). In other words, one or more of the database objects can be modified by one or more of the object modification methods so that database object(s) have the same form (i.e., structure) and/or substance (i.e., data) of the target upgrade database object(s). The target database object(s) can represent the target upgrade structure and/or target upgrade data of the database object(s).

In some embodiments, the database objects represented by the database object identifiers 215 can be related to a program database and/or a user database. For example, the database object represented by database object identifier Q4 can be an object of a program database associated with an executable program (e.g., an executable file) of a system (e.g., an operating system of the system), and the database object represented by the database object identifier R5 can be an object of a user database including data defined by a user of the system. In some embodiments, a database object can include, for example, configuration data associated with one or more of executable files. In some embodiments, user data included in a user database can include, or can be, business data, financial data, human resources data, and/or so forth.

As shown in FIG. 2A, the entries within the original schedule 230 are associated with (e.g., divided into) original batches. Specifically, entries associated with database objects Q1 through Q4 are included in original batch Q, entries associated with database objects R1 through R5 are included in original batch R, and entries associated with database objects S1 through S5 are included in original batch S.

As indicated by the vertical arrow associated with the original schedule 230, the execution order of the entries included in the original schedule 230 starts at the top and proceeds towards the bottom. Thus, the entries of original batch Q trigger execution of object modification methods A through D associated with database objects Q1 through Q4 before the entries of original batch R trigger execution of object modification methods A through F associated with database objects R1 through R5. Also, database object Q1 is modified by object modification method A before database object Q2 is modified by object modification method B.

As shown in FIG. 2A, the original batches Q, R and S are separated by breaks. Specifically, original batch Q and R are separated by break S1 and original batches R and S are separated by break 52. The breaks can represent logical breaks and/or times at which execution triggered by the entries in the original schedule 230 is stopped (e.g., completely stopped, temporarily stopped) to ensure proper serial execution. For example, original batch R may not trigger execution (e.g., execution of one or more object modification methods represented by the object modification method identifiers 210) until execution triggered by original batch Q (e.g., serial execution of each of the entries within original batch Q) has been completed. Verification that execution triggered by original batch Q has been completed before execution triggered by original batch R is initiated can be verified at break 51. In some embodiments, the breaks can be referred to as syncmarks.

Figure 2B:
FIG. 2B is a block diagram that illustrates execution dependencies between the object modification methods represented within FIG. 2A.
Figure 2B:
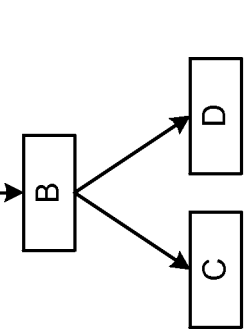

In this embodiment, the ordering of the entries (for execution) within each of the original batches of the original schedule 230 is based on dependencies. The order of execution within an original batch can be referred to as an intra-batch execution order. In this embodiment, certain of object modification methods represented within the original schedule 230 must be performed before other object modification methods as illustrated in FIG. 2B. In other words, at least some of the execution logic associated with the original schedule is illustrated in FIG. 2B.

FIG. 2B is a block diagram that illustrates execution dependencies between the object modification methods represented within FIG. 2A. As shown in FIG. 2B, the object modification method A must be executed before object modification method B. Accordingly, object modification method B may be referred to as being dependent upon (or having a dependent relationship with) object modification method A.

In some embodiments, execution of object modification method A before execution of object modification method B may be required because object modification method A may modify portions of data associated with database object that may be later modified by object modification method B. Modification of the data in a different order (using object modification method B before A) could result in errors in the data associated with database object and/or execution of the object modification methods.

In some embodiments, execution of object modification method A before execution of object modification method B may be required because object modification method A may modify portions of a program (e.g., executable program) that may be relied on by object modification method B for proper execution. In some embodiments, the program affected by object modification method A may be associated with a database object for which object modification method A is being executed.

As shown in FIG. 2B, the object modification method A must be executed before object modification methods C and D. Accordingly, object modification methods C and D may be referred to as being dependent upon (or having a dependent relationship with) object modification method B. As shown in FIG. 2B, the object modification methods C and D do not have a dependent relationship with one another. The dependencies of object modification methods C and D on object modification method B may be similar to the reasons discussed above with respect to the dependent relationship between object modification method A and B. As shown in FIG. 2B, object modification method C and D may be executed with respect to one another in any order. Thus, object modification method C may be executed in parallel with object modification method D.

In this embodiment, object modification methods E and F are associated with a category of object modification method that is different than a category of object modification method associated with object modification methods A through D. Specifically, object modification methods E and F are associated with category 1 and object modification methods A through D are associated with category 2. In this embodiment, object modification method F is dependent on object modification method E. Also, as shown in FIG. 2B, the object modification methods associated with category 1 are independent from the object modification methods associated with category 2. Accordingly, the object modification methods associated with category 1 may be executed before or after the object modification methods associated with category 2. In some embodiments, the category 1 object modification methods can be AIMs and the category 2 object modification methods can be XPRAs. In some embodiments, the object modification methods may be classified as being independent because they are associated with different categories.

Referring back to FIG. 2A, the order of execution within each of the original batches (i.e., the intra-batch execution order) of the original schedule 230 is based on the execution logic illustrated in FIG. 2B. For example, as shown in original batch Q, the object modification method A (associated with database object Q1) is scheduled for execution before object modification method B (associated with database object Q2), and object modification method B is scheduled for execution before modification methods C and D (associated with database objects Q3 and Q4).

As shown in FIG. 2A, original batch Q is executed before original batch R, and original batch R is executed before original batch S. The execution order related to the original batches (which are separated by breaks) can be referred to as inter-batch execution order. In some embodiments, the database objects included in original batch Q may need to be modified before the database objects included in original batch R, because of dependencies between at least a portion of the database objects included in original batch Q and at least a portion of the database objects included in original batch R. For example, the database object R3 (included in original batch R) may have data linked to database object Q3 (included in original batch Q). Thus, modification of data included in the database object Q3 may need to be completed so that linkages (e.g., references) in database object R3 may be properly defined when the database object R3 is modified. Similarly, the database objects included in original batch R may need to be modified before the database objects included in original batch S, because of dependencies between at least a portion of the database objects included in original batch R and at least a portion of the database objects included in original batch S.

In some embodiments, each of the original batches of the original schedule 230 can be associated with or can define different support packages for upgrade of at least a portion of a system (such as system 100 shown in FIG. 1). For example, original batch Q can be associated with a support package, and the original batch R can be associated with a different support package. Thus, the execution order of the original schedule 230 can be defined based on support packages.

As shown in FIG. 2A, the execution of the object modification methods (represented by the object modification method identifiers 210) for the database objects (represented by the database object identifiers 215) triggered by the entries is reordered within the modified schedule 220. As illustrated by the vertical arrow associated with the modified schedule 220, the execution order of the entries included in the modified schedule 220 starts at the top and proceeds towards the bottom.

As shown in FIG. 2A, the entries included in the original batches of the original schedule 230 are included in (e.g., organized into) different modified batches (i.e., modified batches P2 through P5) of the modified schedule 220. Thus, the entries from the original schedule 230 are used to define the modified schedule 220. The original batches of the original schedule 230, if aligned with specific support packages, are broken up to define the modified batches of the modified schedule 220. In other words, each of the modified batches of the modified schedule 220 may be defined based on portions of various support packages of the original schedule 230.

For example, the entries included in original batch Q of the original schedule 230 are included in modified batches P2 through P4 of the modified schedule 220 as represented by the arrows. In this embodiment, each of the four entries included in original batch Q of the original schedule 230 are included in three separate modified batches (i.e., modified batches P2 through P4) of the modified schedule 220. In some embodiments, the entries included in a particular original batch of an original schedule may not be included in separate modified batches of a modified schedule. As a specific example, the first two entries included in original batch S of the original schedule 230 are included in modified batch P2 of the modified schedule 220.

Although the entries included in the original batches of the original schedule 230 are included in different modified batches of the modified schedule 220, the execution logic associated with the original schedule 230 is used to define the execution order of the modified schedule 220. Specifically, in this embodiment, the modified schedule 220 is defined in accordance with (e.g., based on a combination of) the intra-batch dependencies and the inter-batch dependencies associated with the original schedule 230.

In this embodiment, modified batches P2 through P4 of the modified schedule 220 are defined based on alignment of the object modification methods (which may represent different functional types of object modification methods). Specifically, modified batch P2 includes entries associated with object modification method A, and entries associated with object modification method B, modified batch P3 includes entries associated with object modification method C, and modified batch P4 includes entries associate with object modification method D. The entries associated with the object modification method A are grouped within the modified batch P2 before the group of entries associated with the object modification method B. As shown in FIG. 2A, the entries associated with the object modification method A can be referred to as group A within the modified batch P2, and the group of entries associated with the object modification method B within the modified batch P2 can be referred to as group B.

Although not shown in FIG. 2A, in some embodiments, the entries associated with object modification method A can be included in a different modified batch than the entries associated with object modification B. In other words, in some embodiments, the entries associated with object modification method A and included in group A can define a separate modified batch from the entries associated with object modification method B included in group B. If included in different modified batches, the different modified batches can be separated by a break (not shown).

Because the modified batches of the modified schedule 220 are defined based on the object modification methods, the execution order of the modified batches of modified schedule 220 can be defined based on dependencies between the object modification methods (i.e., the function types of the object modification methods) as illustrated in FIG. 2B. For example, the dependencies between the object modification methods (as illustrated in FIG. 2B) are used to define the execution order of modified batches P2 through P4 of the modified schedule 220. Specifically, as shown in the modified schedule 220, the database objects associated with the object modification method A are scheduled for modification based on object modification method A before the database objects associated with the object modification method B are scheduled for modification based on object modification method B in accordance with the dependencies illustrated in FIG. 2B. In this embodiment, the intra-batch dependencies between the object modification methods, as included in the original schedule 230, are used to define the inter-batch execution order as defined in the modified schedule 220. Also, the intra-batch dependencies between the object modification methods, as included in the original schedule 230, are used to define the intra-batch execution order grouping (i.e., the intra-batch execution order grouping within modified batch P2) as defined in the modified schedule 220. Thus, inter-batch ordering and/or intra-batch order grouping for execution within modified batches may be defined within the modified schedule 220 based on functional types of object modification methods associated with the entries included in the original schedule 230.

As shown in FIG. 2A, modified batch P3 and modified batch P4 are associated with a parallel portion and are executed in parallel (during a parallel execution time period) between a first serial portion and a second serial portion (which may each be executed during serial execution time periods). The first serial portion includes modified batch P2, and the second serial portion includes modified batch P5. Because the object modification method C and D do not have a dependent relationship with one another, as shown in FIG. 2B, the entries of modified batch P3 and modified batch P4, which are associated with object modification methods C and D, may be executed in parallel. Thus, the entries included in modified batch P3 and modified batch P4, which are strictly executed in a serial fashion in the original schedule 230 are executed in a parallel fashion in the modified schedule 220.

As shown in FIG. 2A, although batches P3 and P4 are executed as batches in parallel. In some embodiments, the entries within each of these batches may be executed serially. For example, object modification method C may be configured to modify database object Q3 (from batch P3) in parallel within object modification method D modifying database object Q4 (from batch P4). However, object modification method C may be not modify database object R3 (from batch P3) until object modification method C has completed modification of database object Q3 (also from batch P3).

Because at least some of the entries are executed in parallel in accordance with the modified schedule 220, processing resources (e.g., computing resources) may be more efficiently utilized in accordance with the modified schedule 220 in comparison with the utilization of processing resources used to execute entries in accordance with the original schedule 230. Said differently, the execution time of the entries in accordance with the original schedule 230 may be longer than the execution time of the entries in accordance with the modified schedule 220.

As shown in FIG. 2A, modified batch P5 includes an entry associated with object modification method F (and database object R5) and an entry associated with object modification method E (and database object S5). The order of execution of the entries included in modified batch P5 of the modified schedule 220 is aligned with the dependent relationship between the object modification methods E and F shown in FIG. 2B. Specifically, the entry associate object modification F is scheduled for execution after the entry associated with object modification E in accordance with the dependent relationship between the object modification methods E and F shown in FIG. 2B.

The object modification methods E and F are associated with a different category of object modification method than the object modification methods associated with modified batches P2 through P4. Specifically, the object modification methods F and E are associated with category 1 (as shown in FIG. 2B) and the object modification methods associated with modified batches P2 through P4 are associated category 2 (as shown in FIG. 2B). In accordance with the relationship between the different categories of object modification methods discussed in connection with FIG. 2B, modified batch P5 is scheduled for execution after execution of modified batches P2 through P4. In some embodiments, modified batch P5 may be scheduled for execution of modified batches P2 through P4 so long as their respective associated object modification method categories do not have a dependency that dictates otherwise. Thus, inter-batch ordering for execution may be defined within the modified schedule 220 based on object modification method categories associated with the entries included in the original schedule 230.

Also, the dependencies between the database objects of the original batches Q, R, and S are used to define the execution order within the modified batches P2 through P5 (i.e., the inter-batch execution order of the modified batches P2 through P5) of the modified schedule 220. In this embodiment, the execution order of the database objects of the original batches Q, R, and S, is maintained within each of the modified batches P2 through P5. As a specific example, within the original schedule 230, database object Q1 is scheduled for modification within original batch Q based on object modification method A before database object R1 is scheduled for modification within original batch R based also on object modification method A. The execution order associated with these entries (which occurs in different modified batches) is maintained in the modified schedule 220. Within the modified schedule 220, database object Q1 is scheduled for modification based on object modification method A before database object R1 is scheduled for modification based also on object modification method A. Both of these entries, however, are scheduled for execution within the modified schedule 220 within the same modified batch—modified batch P2. Thus, the inter-batch execution order shown in the original schedule 230 is used to define at least some of the intra-batch execution order as defined within the modified batches of the modified schedule 220.

In some embodiments, the execution order of entries of the modified schedule 220 (or portions thereof) can be defined based only on dependencies between database objects (and dependencies between object modification methods may not be used). In some embodiments, the execution order of entries of the modified schedule 220 (or portions thereof) can be defined based only on dependencies between object modification methods (and dependencies between database objects may not be used).

In some embodiments, conflicts between dependencies used to define the modified schedule 220, if they arise, can be resolved based on a rules-based algorithm. For example, dependencies between a set of database objects associated with a set of entries may dictate that the entries should be executed in a particular order. Dependencies between a set of object modification methods also associated with the set of entries may dictate that the entries should be executed in a different order (than the particular order dictated by the dependencies between the set of database objects). In such instances, conflicts between the dependencies of the set of database objects in the dependencies of the set of object modification methods can be resolved using a rules-based algorithm so that an execution order (e.g., a single execution order) may be defined.

As shown in FIG. 2A, the original schedule 230 includes three original batches, and the modified schedule 220 includes five different modified batches. In some embodiments, a modified schedule can be defined with less batches than are included in an original schedule. Thus, more breaks can be inserted with smaller batches. In some embodiments, a modified schedule can be defined with an equal number of batches as an original schedule. In some embodiments, the original schedule 230 can include more or less batches than are shown in FIG. 2A, and the modified schedule 220 can also include more or less batches than are shown in FIG. 2A. Thus, in some embodiments, the number of batches that are executed within the parallel portion of the modified schedule 220 can be greater than the number of batches shown in FIG. 2A.

Although the number of original batches included in the original schedule 230 can be different than the number of modified batches included in the modified schedule 220, the number of entries included in the original schedule 230 can be equal to the number of entries included in the modified schedule 220. As shown in FIG. 2A, each of the entries included in the original schedule 230 is included only once in the modified schedule 220.

In some embodiments, the modified batches within the parallel portion of the modified schedule 220 may be scheduled for execution in parallel based on resources (e.g., computing resources) available for processing of the modified batches. In some embodiments, one or more modified batches from the parallel portion of the modified schedule 220 may be randomly selected for execution, executed in a round-robin fashion, and/or so forth. In some embodiments, one or more modified batches from the parallel portion of the modified schedule 220 may be executed based on size (e.g., a threshold size, a bit size, a number of fields, a number of columns and/or rows), complexity, and/or so forth.

In some embodiments, the execution logic used to define the execution order of the original schedule 230 can be determined based on metadata associated with one or more of the original batches included in the original schedule 230. For example, if one or more of the original batches is associated with one or more support packages, metadata describing the support package(s) can be used to determine the execution logic used to define the execution order of the original schedule 230. In some embodiments, the metadata associated with the original batches (and/or support packages) can include information about the order of execution of entries (object modification methods and associated data objects) included within the original batches.

In some embodiments, break 51 from the original schedule 230 can correspond with break 54 of the modified schedule 220. Also, break 52 from the original schedule 230 can correspond with break 55 of the modified schedule 220. In some embodiments, modified schedule 220 can have breaks that are not included in the original schedule 230. In some embodiments, the modified schedule 220 can have a number of breaks less than or equal to a number of breaks included in the original schedule 230.

As mentioned previously, if the grouped entries included in modified batch P2 (i.e., the group A associated with object modification method A and the group B associated with object modification method) are included in separate modified batches, a break can be inserted between the separate modified batches. Thus, additional breaks can be inserted into the first serial portion between groups of entries within one or more of the modified batches to define more modified batches than shown in FIG. 2A. In some embodiments, additional breaks can be inserted into the modified batches within the parallel portion and/or in the modified batch of the second serial portion to define more modified batches than shown in FIG. 2A.

Figure 3:
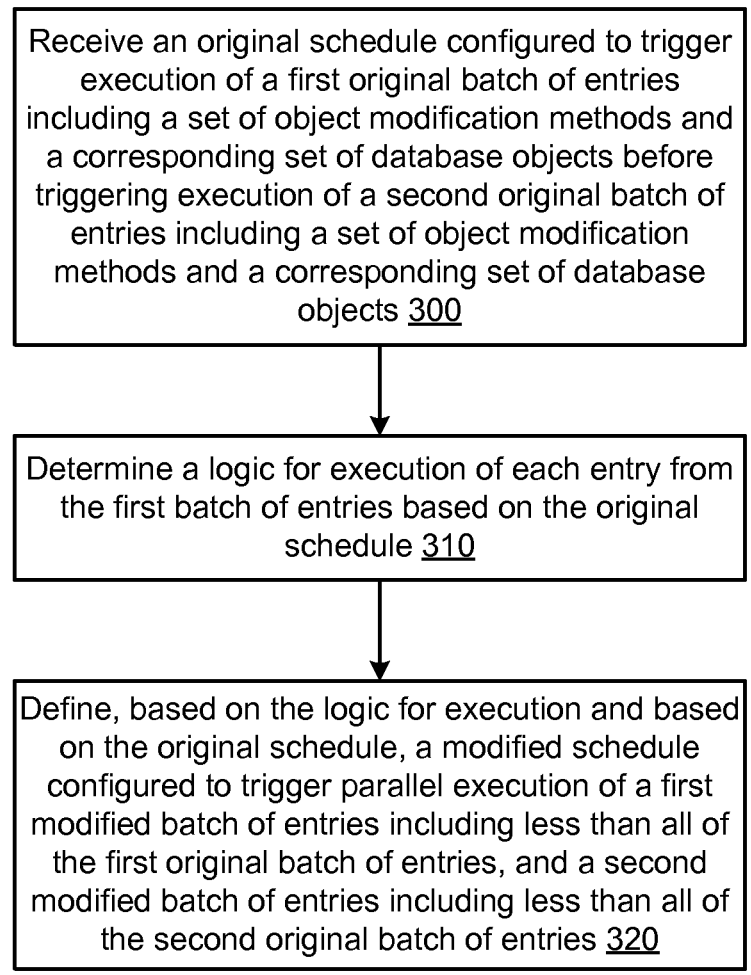
FIG. 3 is a flowchart that illustrates a method for defining a modified schedule based on an original schedule.

FIG. 3 is a flowchart that illustrates a method for defining a modified schedule based on an original schedule. In some embodiments, one or more portions of the method may be executed at the system 100 shown in FIG. 1 and/or by the schedule module 130 shown in FIG. 1.

As shown in FIG. 3, an original schedule configured to trigger execution of a first original batch of entries including a set of object modification methods and a corresponding set of database objects before triggering execution of a second original batch of entries including a set of object modification methods and a corresponding set of database objects is received (block 300). In some embodiments, the receiving can be performed by the original schedule module 132 shown in FIG. 1. In some embodiments, each database object from the set of database objects of the first original batch of entries can be associated with a single object modification method from the first original batch of entries. Similarly, each database object from the set of database objects of the second original batch of entries can be associated with a single object modification method from the second original batch of entries.

A logic for execution of each entry from the first original batch of entries is determined based on the original schedule (block 310). In some embodiments, the logic for execution can be determined by the analysis module 134 shown in FIG. 1. In some embodiments, the logic for execution can include an execution order. In some embodiments, the logic for execution can be determined based on metadata associated with the first original batch of entries.

Based on the logic for execution and based on the original schedule, a modified schedule configured to trigger parallel execution of a first modified batch of entries including less than all of the first original batch of entries, and a second modified batch of entries including less than all of the second original batch of entries is defined (block 320). In some embodiments, the modified schedule can be defined based on the logic for execution and based on the original schedule by the modified schedule generator 136 shown in FIG. 1. In some embodiments, the parallel execution can be associated with the parallel portion of the modified schedule, and the parallel execution can be before or after a serially executed portion of the modified schedule. In some embodiments, the first modified batch of entries can also include less than all of the second original batch of entries (which may be mutually exclusive with the portion of the second original batch of entries included in the second modified batch entries). In some embodiments, the second modified batch of entries can also include less than all of the first original batch of entries (which may be mutually exclusive with the portion of the first original batch of entries included in the first modified batch of entries).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user ca provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A computer system including instructions stored on a non-transitory computer-readable storage medium, the computer system comprising:

an original schedule module configured to receive an original schedule configured to trigger execution of a first original batch of entries including a set of object modification methods and a corresponding set of database objects before triggering execution of a second original batch of entries including a set of object modification methods and a corresponding set of database objects, each object modification method of each of the sets of object modification methods has an associated category such that a first category includes object modification methods configured to operate on multiple database objects and a second category includes object modification methods configured to operate on a single database object;

an analysis module configured to determine a logic for execution of each entry from the first original batch of entries based on the original schedule and the corresponding category for each of the object modification methods; and a schedule generator configured to define, based on the logic for execution and based on the original schedule, a first modified batch of entries including less than all of the first original batch of entries, a second modified batch of entries including less than all of the second original batch of entries having object modification methods of one of the first category or the second category, a third modified batch of entries including a portion of at least one of a remainder of the first original batch of entries and a remainder of the second original batch of entries, the third modified batch of entries having object modification methods of one of the first category or the second category different from the second modified batch of entries, at least one break based on a dependency between an entry in the third modified batch of entries and an entry in at least one of the first modified batch of entries and the second modified batch of entries, and a modified schedule configured to trigger parallel execution of the first modified batch of entries and the second modified batch of entries followed by serial execution of the break and the third modified batch of entries.

2. The computer system of claim 1, wherein the modified schedule is configured to trigger execution of a fourth batch of entries including a portion of the first original batch of entries before the parallel execution of the first modified batch of entries and the second modified batch of entries is triggered.

3. The computer system of claim 1, wherein the original schedule is configured to trigger execution of a number of entries equal to a number of entries triggered for execution by the modified schedule.

4. The computer system of claim 1, wherein the first modified batch of entries and the second modified batch of entries are defined based on a plurality of categories associated with the set of object modification methods of the first original batch of entries and the set of object modification methods of the second original batch of entries.

5. The computer system of claim 1, wherein an execution order of entries from the first modified batch of entries is defined by the analysis module based on the first original batch of entries being triggered for execution before the second original batch of entries by the original schedule.

6. The computer system of claim 1, wherein the set of object modification methods associated with the first original batch of entries includes a single-use object modification method.

7. The computer system of claim 1, wherein the original schedule is discarded in response to the modified schedule being defined.

8. The computer system of claim 1, wherein the logic for execution is determined based on metadata associated with the first original batch of entries.

9. The computer system of claim 1, wherein the first modified batch of entries are triggered for execution in parallel with the second modified batch of entries based on an availability of processing resources after serially processed portions of the modified schedule have been completed.

10. The computer system of claim 1, wherein the original schedule is configured to trigger execution of the first original batch entries before execution of the second original batch of entries during an upgrade process of a target system, the determining and the defining are performed at the target system.

11. The computer system of claim 1, wherein the logic for execution is a first logic for execution based on dependent relationships between at least a portion of the set of database objects associated with the first original batch of entries, the analysis module is configured to determine a second logic for execution based on dependent relationships between at least a portion of the set of object modification methods associated with the second original batch of entries, the defining of the modified schedule is based on the first logic for execution and the second logic for execution.

12. The computer system of claim 1, wherein the modified schedule is configured to trigger the parallel execution during a parallel execution time period, the portion of the first batch of object modification methods is a first portion of the first batch of object modification methods, the portion of the second batch of object modification methods is a first portion of the second batch of object modification methods, the modified schedule is configured to trigger execution of a second portion of the first batch of object modification methods and a second portion of the second batch of object modification methods as a third batch of object modification methods during a batch execution time period before the parallel execution time period.

13. The computer system of claim 1, wherein the logic for execution includes an order for execution.

14. The computer system of claim 1, wherein the set of object modification methods associated with the first original batch of entries includes an after import method configured for execution after at least one of the database objects from the set of database object associated with the first original batch of entries is imported into a target system during an upgrade process.

15. A non-transitory computer-readable storage medium storing code representing instructions that when executed are configured to cause a processor to perform a process, the code comprising code to:

receive an original schedule configured to trigger execution of a first original batch of entries including a set of object modification methods and a corresponding set of database objects before triggering execution of a second original batch of entries including a set of object modification methods and a corresponding set of database objects, each object modification method of each of the sets of object modification methods has an associated category such that a first category includes object modification methods configured to operate on multiple database objects and a second category includes object modification methods configured to operate on a single database object;

determine a logic for execution of each entry from the first original batch of entries based on the original schedule and the corresponding category for each of the object modification methods; and define, based on the logic for execution and based on the original schedule, a first modified batch of entries including less than all of the first original batch of entries, a second modified batch of entries including less than all of the second original batch of entries having object modification methods of one of the first category or the second category, a third modified batch of entries including a portion of at least one of a remainder of the first original batch of entries and a remainder of the second original batch of entries, the third modified batch of entries having object modification methods of one of the first category or the second category different from the second modified batch of entries, at least one break based on a dependency between an entry in the third modified batch of entries and an entry in at least one of the first modified batch of entries and the second modified batch of entries, and a modified schedule configured to trigger parallel execution of the first modified batch of entries and the second modified batch of entries followed by serial execution of the break and the third modified batch of entries.

16. The non-transitory computer-readable storage medium of claim 15, wherein the modified schedule is configured to trigger execution of a fourth batch of entries including a portion of the first original batch of entries before the parallel execution of the first modified batch of entries and the second modified batch of entries is triggered.

17. The non-transitory computer-readable storage medium of claim 15, wherein the original schedule is configured trigger execution of a number of entries equal to a number of entries triggered for execution by the modified schedule.

18. The non-transitory computer-readable storage medium of claim 15, wherein the first modified batch of entries and the second modified batch of entries are defined based on a plurality of categories associated with the set of object modification methods of the first original batch of entries and the set of object modification methods of the second original batch of entries.

19. A method including executing instructions recorded on a non-transitory computer-readable storage media using at least one processor, the method comprising:

receiving, by the processor, an original schedule configured to trigger execution of a first original batch of entries including a set of object modification methods and a corresponding set of database objects before triggering execution of a second original batch of entries including a set of object modification methods and a corresponding set of database objects, each object modification method of each of the sets of object modification methods has an associated category such that a first category includes object modification methods configured to operate on multiple database objects and a second category includes object modification methods configured to operate on a single database object;

determining, by the processor, a logic for execution of each entry from the first original batch of entries based on the original schedule and the corresponding category for each of the object modification methods; and defining, by the processor, based on the logic for execution and based on the original schedule, a first modified batch of entries including less than all of the first original batch of entries, a second modified batch of entries including less than all of the second original batch of entries having object modification methods of one of the first category or the second category, a third modified batch of entries including a portion of at least one of a remainder of the first original batch of entries and a remainder of the second original batch of entries, the third modified batch of entries having object modification methods of one of the first category or the second category different from the second modified batch of entries, at least one break based on a dependency between an entry in the third modified batch of entries and an entry in at least one of the first modified batch of entries and the second modified batch of entries, and a modified schedule configured to trigger parallel execution of the first modified batch of entries and the second modified batch of entries followed by serial execution of the break and the third modified batch of entries.

20. The method of claim 19, wherein the modified schedule is configured to trigger, by the processor, execution of a fourth batch of entries including a portion of the first original batch of entries before the parallel execution of the first modified batch of entries and the second modified batch of entries is triggered.

* * * * *